United States Patent [19]

Bhuva

[11] Patent Number: 5,610,624
[45] Date of Patent: Mar. 11, 1997

[54] SPATIAL LIGHT MODULATOR WITH REDUCED POSSIBILITY OF AN ON STATE DEFECT

[75] Inventor: Rohit L. Bhuva, Plano, Tex.

[73] Assignee: Texas Instruments Incorporated, Dallas, Tex.

[21] Appl. No.: 346,812

[22] Filed: Nov. 30, 1994

[51] Int. Cl.$^6$ .................................................. G09G 3/34
[52] U.S. Cl. ............................................. 345/84; 345/85
[58] Field of Search ................................. 345/84, 85, 90, 345/94, 97, 100

[56] References Cited

U.S. PATENT DOCUMENTS

| | | | |
|---|---|---|---|
| 4,229,732 | 10/1980 | Hartstein et al. | 340/378.2 |
| 5,061,049 | 10/1991 | Hornbeck | 359/224 |
| 5,079,544 | 1/1992 | DeMond et al. | 340/701 |
| 5,105,369 | 4/1992 | Nelson | 364/525 |
| 5,278,652 | 1/1994 | Urbanus | 358/160 |
| 5,499,062 | 3/1996 | Urbanus | 345/84 |

FOREIGN PATENT DOCUMENTS

| | | | |
|---|---|---|---|
| 60610665 | 8/1994 | European Pat. Off. | 345/84 |
| 92009065 | 5/1992 | WIPO | 345/84 |

*Primary Examiner*—Ulysses Weldon
*Attorney, Agent, or Firm*—Robert C. Klinger; James C. Kesterson; Richard L. Donaldson

[57] ABSTRACT

A Spatial Light Modulator (10) having control circuitry (40,42,44,46) which insures that shorts (70,72) between some of the circuitry will result in "off" state defects. Sets of pixel elements (11) share a memory cell (12), each pixel element (11) in a set being switched to an on or off state by a reset line (13) that is separate from that of the other pixel elements (11) in that set. A pair of address electrode etches (44,46) are separated from each other and straddle a pair of data carrying etches (40,42). A zero is loaded to the data etches (40,42) when not loading memory cell (12) such that a short between the address electrode etches and the data etches will result in an "off" state pixel defect upon a reset pulse.

16 Claims, 2 Drawing Sheets

SPATIAL LIGHT MODULATOR WITH REDUCED POSSIBILITY OF AN ON STATE DEFECT

CROSS REFERENCE TO A RELATED APPLICATION

Cross Reference is made to the following co-pending patent applications: Ser. No. 08/002,627 entitled "Pixel Control Circuitry for Spatial Light Modulator", filed Jan. 8, 1993; "Memory Cell with Single Bit Line Read Back", filed herewith.

TECHNICAL FIELD OF THE INVENTION

This invention relates generally to spatial light modulators (SLMs), especially those known as deformable mirror devices (DMD), and more particularly to pixel control circuitry for increasing the probability of an "Off" defect rather than an "On" defect if circuit etches should become shorted.

BACKGROUND OF THE INVENTION

Spatial light modulators (SLMs) are devices that modulate incident light in a spatial pattern corresponding to an electrical or optical input. The incident light may be modulated in its phase, intensity, polarization, or direction. The light modulation may be achieved by a variety of materials exhibiting various electrooptic or magnetooptic effects, and by materials that modulate light by surface deformation. SLMs have found numerous applications in the areas of optical information processing, projection displays, and electrostatic printing. Reference is here by made to U.S. Pat. No. 5,061,049 to Hornbeck, entitled Spatial Light Modulator and Method; U.S. Pat. No. 5,079,544 to DeMond et al, entitled Standard Independent Digitized Video System; and U.S. Pat. No. 5,105,369 to Nelson, entitled "Printing System Exposure Module Alignment Method and Apparatus of Manufacture", each patent being assigned to the same assignee as the present invention, and the teachings of each are incorporated herein by reference.

The SLM may be binary in that each pixel element of an area or linear array may have a deflectable beam addressable to have either of two states. The pixel element may be "off", and deliver no light to a receiver. Conversely, the pixel element may be "on", and deliver light at a maximum intensity to the receiver. One such SLM is known as a digital micromirror device (DMD), with the deflectable beam mirror element. To achieve a viewer perception of intermediate levels of light, various pulse width modulation techniques can be used. One modulation technique is described in U.S. Pat. No. 5,278,652, entitled "DMD architecture and timing for use in a pulse-width modulated display system", assigned to the same assignee as the present invention, and the teachings of which are incorporated herein by reference.

One existing DMD pixel loading technique requires at least one memory cell per pixel element. As a number of pixels per frame increases, the memory requirements for such an SLM device results in increased cost and reduced manufacturing yields. Currently, linear arrays of 64×7056 pixels, and area arrays of 1000×2000 pixels are being developed. One improvement to this technique is to time-multiplex one memory cell to a plurality of pixels grouped as a set of pixels. This technique is also known as split-reset, wherein each pixel of the pixel group is individually reset (addressed) to selectively load data from an associated memory cell. In one embodiment, four pixels may be associated with a single memory cell, whereby the contents of this memory cell are used to selectively control the position of the pixels associated with that memory cell. Only one pixel may be controlled at a given time, thus lending to the technique known as split-reset control. For additional discussion on this technique, cross reference is hereby made to co-pending patent application Ser. No. 08/002,627 entitled "Pixel Control Circuitry for Spatial Light Modulator", assigned to the same assignee as the present application, and the teachings of which are incorporated herein by reference.

These mirrors in a DMD type array are densely arranged, and may have a width of approximately 17 microns. Thus, the associated address and control circuitry located under the pixel mirrors correspondingly has small dimensions as well. For instance, circuit etches provided in the semiconductor SLM may have etch widths in the range of one micron, and spacing from an adjacent etch of approximately one micron. Even with advanced semiconductor processing techniques, shorts between etches can occasionally occur.

While robust manufacturing techniques may be implemented which are known to achieve high yield semiconductor devices with a minimum number of defects, semiconductor devices also need to be designed to reduce the likelihood of defects, or withstand defects which can occur during the manufacturing process.

SUMMARY OF THE INVENTION

The present invention comprises an SLM with well designed control and address circuit etches. A technical advantage of the present invention is an SLM which insures that certain manufacturing defects will result in an associated pixel being "off" rather than "on". This invention finds use in SLM's whereby an "off" defect is preferable to a "on" defect, where when implemented into a display, such as a projection television, the viewer is less likely to notice an "off" defect (black pixel image) than an "on" defect (white pixel image), or where implemented in a printer, an "on" defect will not generate a black line across the image printed.

Data carrying etches are straddled by address electrode etches, these address electrode etches being connected to a group or set of address electrodes which control the deflection of an associated deflectable element, such as a mirror in a DMD device. With this design, shorts which may occur between any adjacent etches will not result in the address electrode etches being shorted to one another, which would otherwise facilitate either an "off" or "on" pixel defect depending on the data on the data carrying etch.

According to the present invention, the data etches are loaded with a voltage potential associated with the "off" pixel state after loading a memory cell associated with one or more pixels, before biasing the mirror. This insures that if a short exists between either of the data etches and one addressing electrode etch, the DMD mirror(s) associated with the shorted electrode etch will appear as a "off" state defect, and not an "on" state defect. This invention increases the acceptable defect DMD silicon yield dramatically.

DETAILED DESCRIPTION OF THE INVENTION

Figure 1:
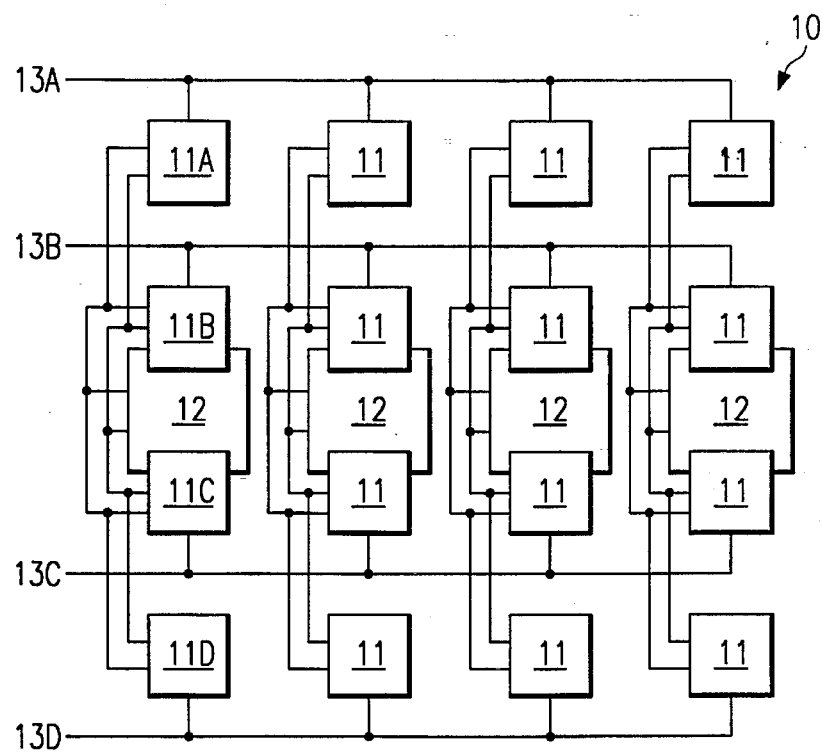
FIG. 1 is a block diagram of a portion of an SLM array, having memory cells associated with groups of pixel elements.

Referring now to FIG. 1 there is shown a block diagram of a portion of a monolithic SLM array 10. Array 10 comprises a plurality of pixel elements 11 that are controlled by associated memory cells 12 and associated reset lines 13. Only a small number of pixel elements 11 with their associated control circuitry are shown for purposes of illustration. A typical SLM array 10 would have thousands of such elements 11 and memory cells 12, and associated reset lines 13. Area arrays of 1000 by 2000 pixels, and linear arrays of 64 by 7056 pixels are under development. FIG. 1 shows how each memory cell 12 serves a unique group of pixel elements 11 using a time multiplex or split reset addressing scheme. Reference is made to co-pending patent application Ser. No. 08/002,627 entitled "Pixel Control Circuitry for Spatial Light Modulator", assigned to the assignee of the present invention, and the teachings of which are incorporated herein by reference. While each memory cell 12 is shown to control a unique set of four pixel elements 11, each memory cell 12 could control groups of four or more pixel elements 11 with appropriate time multiplex control techniques necessary to properly address and control these pixels for each frame of an associated display, and such designs are within the scope of the present invention.

SLM 10 is, for purposes of this description, a device known as a digital micromirror device (DMD). DMD's are dense arrays of tiny micro-mechanical mirror elements, which may be modulated to provide the viewer of a display generated by the DMD with a perception of varying intensity, or utilized in a printer to expose a printing medium. An example of a DMD is that manufactured by Texas Instrutunents Incorporated of Dallas, Tex. However, the present invention is not limited to the use of DMD's for SLM 10, and may be used with other types of SLM's having addressable pixel elements, such as liquid crystal displays (LCDs).

In the foregoing cross-referenced time-multiplexed control scheme, the reset (address) lines 13 control the time when the associated pixel elements 11 change their deflection state according to the contents of the associated memory cells 12. The deflection states of the pixel elements 11 change, or remain the same, according to the data which is stored in the associated memory cell 12, simultaneously in response to a reset signal on the respective line 13. In other words, the pixel elements 11 retain their current deflection state as the data supplied to their address electrode from their associated memory cell 12 changes, and then assume their next deflected state as a function of the associated memory cell contents upon receiving a reset signal on line 13.

For purposes of describing the present invention, each pixel element 11 in the set of four pixel elements is associated with one memory cell 12, each pixel 11 being connected to a different one of four reset lines 13. Thus, each pixel element 11 in a set can change its deflection state at a different time from that of another pixel elements 11 in that same set, as a function of its reset line.

Figure 2:
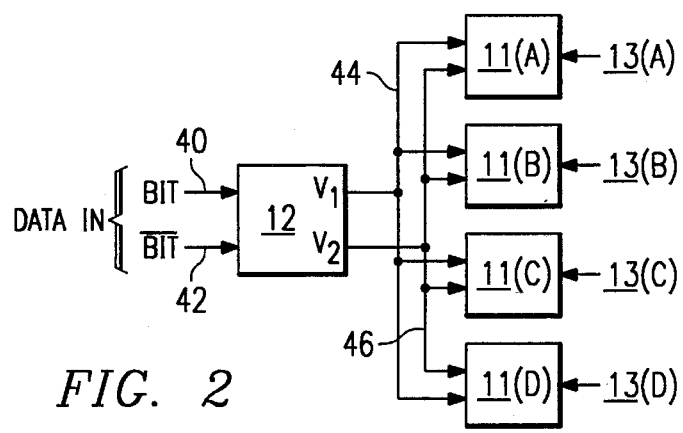
FIG. 2 illustrates a memory cell having a fan out of four pixels.

FIG. 2 illustrates a set of four pixel elements 11, their associated memory cell 12 and reset lines 13, and the related interconnections. Each pixel element 11 is labeled in terms of the reset line 13 to which it is connected, i.e. pixel element 11 (A) is connected to reset line 13 (A) and so forth. Each pixel 11 has associated therewith a pair of semiconductor addressing electrodes 20 and 22 (see FIG. 4) connected to an associated memory cell 12. Either a "one" or a "zero" value may be delivered to the pixel elements 11. When the memory cell 12 is switched, that is, caused to send its stored value, that value is delivered to the addressing electrodes 20 and 22 of all pixel elements 11 to which the memory cell 12 is connected. However, a signal on the associated reset line 13 of pixel element 11 is necessary for that pixel element 11 to change or maintain a deflection state according to the value of the associated memory cell 12.

Figure 3:
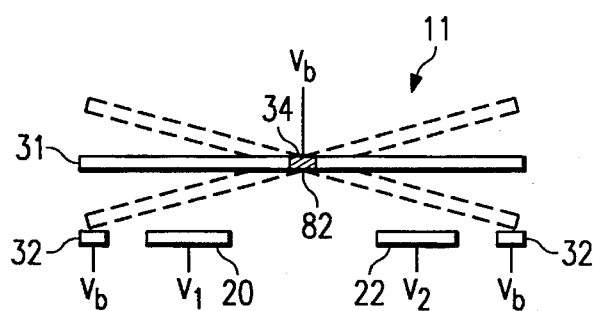
FIG. 3 illustrates the bi-stable operation of a mirror element of a DMD-type SLM.

Referring now to FIG. 3, a cross sectional illustration of a signal pixel element 11 of a typical DMD type SLM 10 is shown. Spatial light modulation is provided by a reflective mirror 31, which flits in either of two directions. The two stable states of mirror 31 are indicated by the dotted lines. In the mirror's stable positions, one end of mirror 31 has moved toward one of two landing electrodes 32. The two address electrodes 20 and 22 are connected to the outputs $V_1$ and $V_2$ of the memory cell 12 whose fan out includes that pixel element 11 (see FIG. 2). A reset voltage is applied to the conductive mirror 31 by means of conductive mirror hinges 34 being connected to reset line 13 via conductive support posts (not shown). Address electrodes 20 and 22 are used to apply a voltage difference, such that one end of mirror 31 is electrostatically attracted to its underlying address electrode of the greatest potential. The reset voltage at mirror 31 determines whether the mirror 31 has a large enough potential with respect to one electrode 20 or 22 to actually rotate to the corresponding landing electrode 32. Thus, the pixel electrodes 20 and 22 are "loaded" via the memory cell 12, and the mirror 31 reset by biasing reset line 13. If the mirror 31 is tilted in a selected direction, such as toward a display screen, the pixel element will direct source light thereto and will be "on"; otherwise, it is titled so that light will be directed elsewhere, such as to a light trap, and will be "off".

Figure 4:
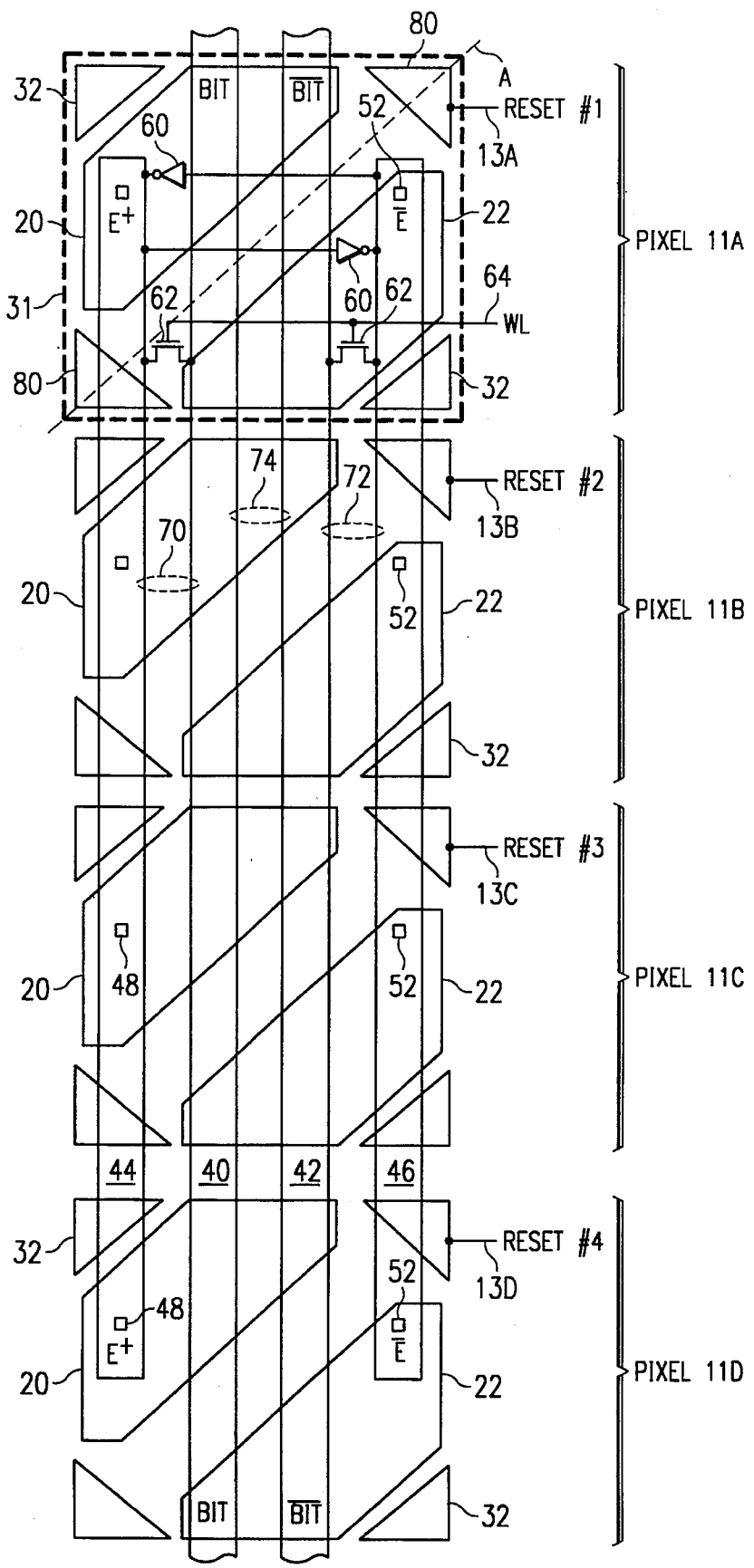
FIG. 4 illustrates one design of data or bit etches and address electrode etches which communicate control signals to pixel addressing electrodes, the biasing of these addressing electrodes determining the deflection of the associated mirror element positioned thereabove, shown in phantom, when addressed.

Referring now to FIG. 4, a top view of four pixel elements 11A-11D is shown with the associated mirrors 31 removed. One memory cell 12 stores and passes data to the address electrodes 20 and 22 of four associated pixels, wherein mirror 31 is pivotable about Axis "A". As shown, a pair of elongated data or bit carrying etches are shown at 40 and 42 extending parallel and closely adjacent one another. Etch 40 is identified as the BIT etch, and complimentary etch 42 is identified as the $\overline{\text{BIT}}$ etch. Straddling data etches 40 and 42 are a pair of elongated address electrode etches identified at 44 and 46. Address electrode etch 44 is identified as the E etch and the opposing complimentary address electrode etch 46 is identified as the $\overline{\text{E}}$ etch. Address electrode etch 44 is connected by respective vias 48 to each pixel address electrode 20, and address electrode etch 46 is connected by respective vias 52 to each of the other pixel address electrodes 22 for this group of four pixels 11, as shown. Thus, each address electrode etch 44 is an electrical contact with each pixel addressing electrode 20, and each address electrode etch 46 is in electrical contact with each pixel addressing electrode 22.

Memory cell 12 is a six transistor cell represented schematically as a pair of inverters 60 connected between each of the address electrode etches 44 and 46, with a pair of pass gates comprising MOS transistors 62 as shown. Memory cell 12 is preferably a Static Random Access Memory (SRAM) cell, wherein each inverter 60 comprises a pair of MOS transistors as is well known in the art. Memory cell 12 is fabricated on a lower and a middle metal layer, and may be implemented using NMOS, PMOS or CMOS technology. Each of etches 40, 42, 44, and 46 are fabricated on metal layer 2, with address electrodes 20 and 22, as well as landing pads 32 and bias pads 80 being fabricated on an upper metal layer. Thus, vias 48 and 52 extend between the middle metal layer and the upper metal layer.

Referring now back to FIG. 2 in view of FIG. 4, pixel data is loaded from shift registers (not shown) into memory cell 12 via BIT line etch 40 and $\overline{BIT}$ line etch 42, as discussed in the cross referenced co-pending patent application entitled "Pixel Control Circuitry for Spatial Light Modulator" incorporated herein by reference. Data is written into the memory cell 12 by addressing the write line 64 to enable transistors 62, and then disabling the write line 64 whereby the data on the bit lines 40 and 42 is latched into the SRAM memory cell 12. The contents of memory cell 12 are thus provided to each address electrode 20 and 22 of pixels 11 of that set.

The content of memory cell 12 is used to selectively deflect the mirror 31 of a selected pixel 11 upon providing a reset (address) signal to the corresponding reset line 13. If a "one" is stored in memory cell 12, a voltage potential, such as +5 volts, will be provided to each of address electrodes 20, and no potential being on address electrodes 22. A reset signal provided to reset line 13A will cause the respective mirror 31 to deflect towards this electrode 20 due to electrostatic attraction, and assume a "on" state. On the other hand, if a "zero" is stored in memory cell 12, a voltage potential, such as +5 volts, will be provided to each of address electrodes 22. A reset signal to reset line 13A would then cause mirror 31 to deflect toward the respective address electrode 22, and assume a "off" state. The other mirrors 31, however, associated with pixels 11B, 11C and 11D maintain their current state as a reset signal is not being provided to other of reset lines 13B, 13C or 13D.

As shown in FIG. 4, the BIT etches 40 and 42 are fabricated to be parallel and extending closely adjacent to one another. Typically, the etches each have a width of 2 microns and are spaced from one another by 2.2 microns. The address electrode etches 44 and 46 are designed to straddle these BIT etches 40 and 42. Address electrode etches 44 and 46 are also parallel to one another, have widths of approximately 2 microns, and are spaced approximately 2.2 microns from the adjacent respective BIT etches 40 or 42.

According to the present invention, after data has been appropriately loaded from a shift register (not shown) into memory cell 12 via BIT etches 40 and 42, BIT etches 40 and 42 are loaded to a "off" state. That is, etches 40 and 42 are loaded as if memory cell 12 was to be loaded with a "zero", such as etch 40 having no potential and complimentary etch 42 having a +5 volt potential. This arrangement anticipates a short existing between BIT etch 40 and address electrode etch 44, as shown in phantom at 70, or between BIT etch 42 and address electrode etch 46 as shown in phantom 72. When a reset pulse is provided to either of reset lines 13A –13D, the associated mirror 31 will maintain an "off" state, toward the associated address electrode 22. Therefore, the short caused at either 70 or 72 will cause a mirror 31 to always assume the "off" defected position when a reset pulse is provided to the respective reset line 13. This is because there is a +5 volt potential on etch 42, and thus address electrode 22, and a 0 volt potential on the etch 40, and thus at address electrode 20, much like memory cell 12 being loaded with a "zero".

Since the mirrors associated with shorts 70 and 72 can be continuously turned "off", the shorts at 70 and 72 are not deemed to be "fatal" defects. However, should a short exist between the BIT etches 40 and 42, such as shown in phantom at 74, this defect would be deemed "fatal" since a logic "one" cannot be sent to only one address electrode 20 or the other address electrode 22 to ensure a predictable deflection upon a reset pulse to line 13. Thus, during a reset pulse, the associated mirror 31 may arbitrarily assume either deflected position. This is because the electrostatic attractive force from one address electrode 20 and the other address electrode 22 for a pixel is not deemed to be stronger than the other. Of course, the mirror 31 could simply maintain a flat state and not deflect toward either landing electrode 32.

In SLM 10, BIT etches 40 and 42 extend in the vertical direction and provide data to a column of pixels 11. As shown in FIG. 1, this column of pixels may comprise of more than one set of pixels 11. As seen in FIG. 1, however, the address electrode etches 44 and 46 only extend between, and connect to, each of the address electrodes 20 and 22, respectively, of the particular set as shown. The pair of landing electrodes 32 are electrically connected to a pair of bias pads 80. These pads 80 connect to and support the conductive mirror support posts (not shown). These posts, inturn, connect to and support conductive mirror hinges 82 (See FIG. 3). Thus, the bias provided by reset line 13 to pads 80 is also provided to the corresponding mirror 31 via the hinges and posts.

According to the present invention, the time multiplexing or split-reset addressing technique can be implemented whereby shorts that may exist between adjacent etches will not result in "fatal" state defects. Rather, these defects are manipulated to result in "off" state defects for the group of pixels 11 associated with the short, such as shown at 70 and 72. The etch design and the technique of loading the bit etches 40 and 42 with a "zero" when not writing to memory cell 11 ensures this "off" state. This invention significantly increases the acceptable defect level of the DMD type SLM.

While the present invention has been set forth as being implemented with a group of four pixels per memory cell, the scope of the present invention is intended to cover 1 memory cell dedicated to each pixel, and also to cover two or more pixels arranged and in groups per memory cell and which may be controlled by the cross-referenced time multiplexed addressing scheme. Limitation to the type of memory cell, the dimensions of the electrodes, etches and pads is not to be inferred.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

We claim:

1. A spatial light modulator, comprising:

an array of individual display cells;

a memory cell associated with each said display cell; a plurality of address electrode pairs, one said pair of address electrodes functionally coupled to each said display cell; a pair of data lines extending adjacent one another and coupled to said memory cell; and a pair of electrode lines separated from one another by said data lines, said electrode lines coupled to said memory cell and coupled to at least one said pair of address electrodes.

2. The Spatial Light Modulator as specified in claim 1 wherein each said electrode line is coupled to a plurality of said address electrode pairs.

3. The Spatial Light Modulator as specified in claim 2 wherein each said display cell has a separate reset line associated therewith.

4. The Spatial Light Modulator as specified in claim 1 wherein said memory cell is associated with a plurality of said display cells.

5. The Spatial Light Modulator as specified in claim 4 wherein one memory cell write line is associated with a plurality of said address electrode pairs.

6. The Spatial Light Modulator as specified in claim 1 wherein said address electrode pairs are connected to each other via an inverter.

7. The Spatial Light Modulator as specified in claim 1 wherein said address electrode pairs are connected to each other via a pair of inverters.

8. The Spatial Light Modulator as specified in claim 1 wherein said memory cell comprises a SRAM memory cell.

9. The Spatial Light Modulator as specified in claim 1 wherein said data lines and said electrode lines are monolithic.

10. The Spatial Light Modulator as spedfied in claim 1 wherein each said data line is connected to one said electrode line via a pass gate.

11. The Spatial Light Modulator as specified in claim 9 wherein said pass gates each comprise at least one transistor.

12. The Spatial Light Modulator as specified in claim 1 wherein said memory cell is implemented in CMOS.

13. The Spatial Light Modulator as specified in claim 1 wherein said memory cell is implemented in NMOS.

14. The Spatial Light Modulator as specified in claim 1 wherein said memory cell is implemented in PMOS.

15. The Spatial Light Modulator as specified in claim 1 wherein said display cells comprise micro mirrors.

16. The Spatial Light Modulator as specified in claim 15 wherein one said pair of address electrodes is positioned under one said micro mirror.

* * * * *